United States Patent Office 3,428,636
Patented Feb. 18, 1969

3,428,636
PROCESS FOR THE PRODUCTION OF
SUBSTITUTED TRIAZINES
Ernst Grigat, Cologne-Stammheim, and Rolf Pütter, Dusseldorf, Germany, assignors to Farbenfabriken Bayer Aktiengesellschaft, Leverkusen, Germany, a corporation of Germany
No Drawing. Filed Jan. 19, 1966, Ser. No. 521,546
Claims priority, application Germany, Feb. 10, 1965, F 45,186
U.S. Cl. 260—248    3 Claims
Int. Cl. C07d 55/50; A01n 9/22

ABSTRACT OF THE DISCLOSURE 6-aryl or 6-haloalkyl-substituted 2,4-dimercapto-1,3,5-triazines having herbicidal properties and a process for producing them by reacting a mole of cyanic acid ester with 2 mols of hydrogen thiocyanate at a temperature of about −50° through +100° C.

---

We have found that substituted 2,4-dimercapto-6-aroxy-1,3,5-triazines are obtained if cyanic acid esters of the general formula $$R(OCN)_x$$

in which R represents a haloalkyl radical or a substituted or unsubstituted aromatic radical, which may also be connected with a heterocyclic radical and $x$ represents an integer from 1 to 3, are reacted with hydrogen thiocyanate at temperatures between −50 and +100° C., advantageously from −20 to +50° C., and optionally in a diluent.

The compounds which can be obtained by this process are novel compounds and have the general formula:

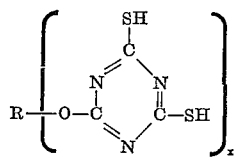

wherein R and $x$ have the meaning indicated above.

The reaction proceeds as follows with a molar ratio between cyanic acid esters and HSCN of 1:2, taking phenyl cyanate as example:

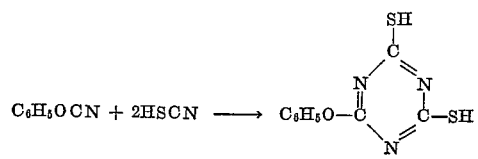

The haloalkyl radicals advantageously are alkyl radicals with 1 to 20 carbon atoms which are wholly or partially substituted by like or different halogen atoms, such as fluorine, bromine, chlorine or iodine.

As substituted or unsubstituted aromatic radicals R, there are considered hydrocarbon radicals with up to 20 carbon atoms in the ring system and which may be substituted. The following are mentioned as examples: phenyl, naphthyl, diphenyl, diphenyloxide, diphenylmethane, diphenylpropane, diphenylsulphide, diphenylsulphone, dinaphthyl, anthracenyl or phenanthrenyl radicals.

To be considered as heterocyclic radicals R are for example 5-membered and 6-membered ring systems which contain from 1 to 3 nitrogen, oxygen or sulphur atoms and are connected to an aromatic ring system having up to 10 carbon atoms. The following heterocyclic radicals are advantageously mentioned: quinoline, isoquinoline, carbazole, diphenyloxide, xanthene, indole, acridine, indazole, benztriazole, benzimidazole, phenazine, quinoxaline, benzoxazole, phenoxazine, benzthiazole, thionaphthene or thioxanthene.

The aromatic or heterocyclic radicals can for example carry like or different substituents as hereinafter indicated: alkyl (advantageously with 1 to 20 carbon atoms), aryl (advantageously optionally substituted phenyl or naphthyl radicals), monoalkylamino and dialkylamino (advantageously each with 1 to 18 carbon atoms in the alkyl radical), acylamino (advantageously with an aliphatic radical with 1 to 18 carbon atoms and also optionally substituted benzoyl radical), nitro, halogen (fluorine, chlorine, bromine and iodine), alkoxy (advantageously with 1 to 10 carbon atoms) aroxy (advantageously optionally substituted phenoxy or naphthoxy radicals), acyloxy (advantageously aliphatic radical with 1 to 10 carbon atoms and also an optionally substituted benzoyl radical), carbonyl (advantageously CHO), carboxylate (advantageously alkyl with 1 to 18 carbon atoms and optionally substituted phenyl or naphthyl radicals), carboxylic monoalkyl and dialkyl amides (alkyl each with 1 to 18 carbon atoms, it being possible for the two alkyl radicals jointly also to be a constituent of advantageously a 6-ring system optionally containing an oxygen or sulphur atom), carboxylic monoaryl and diaryl amides (advantageously optionally substituted phenyl or naphthyl radical), sulphonic esters (aliphatic radicals with 1 to 10 carbon atoms and also an optionally substituted phenyl radical), sulphonic acid monoalkyl and dialkyl amides (alkyl each with 1 to 18 carbon atoms, it being possible for the two alkyl radicals jointly also to form a constituent of a 6-ring system optionally containing an oxygen or sulphur atom), sulphonic monoaryl and diaryl amides (advantageously optionally substituted phenyl or naphthyl radical), acyl (the alkyl radical containing 1 to 18 carbon atoms as well as an optionally substituted benzoyl radical), cyano, thiocyanate, alkyl-mercapto (alkyl with advantageously 1 to 18 carbon atoms), arylmercapto (advantageously optionally substituted phenyl or naphthyl radical) or acylmercapto radicals (advantageously alkyl with 1 to 18 carbon atoms as well as optionally substituted benzoyl radical).

The aforementioned optionally substituted phenyl naphthyl or benzoyl radicals contain, as substituents, preferably like or different radicals as indicated below: fluorine, chlorine, bromine, iodine, nitro, alkoxy (advantageously 1 to 10 carbon atoms), alkylmercapto (advantageously 1 to 10 carbon atoms) or acyl (advantageously aliphatic radical with 1 to 4 carbon atoms).

The cyanic acid esters used as starting compounds can be prepared in accordance with earlier proposals of the applicants by reaction of compounds containing hydroxyl groups with halocyanides at temperatures which are advantageously below +65° C., optionally in a solvent and in the presence of a base.

The following cyanates can for example be used for the process according to the invention:

Phenyl cyanate, monoalkyl and polyalkyl phenyl cyanates such as 2-, 3- or 4-methyl-, 4-isodecyl-, 4-cyclohexyl-, 2-tert.-butyl-, 3-trifluomethyl, 2,4-dimethyl-, 3,5-dimethyl-, 2,6-diethyl-, 4-allyl-2-methoxy, 4-(1,3,3-trimethyl pentyl)- and 4-n-nonyl phenyl cyanates; aryl phenyl cyanates such as 4-cyanatodiphenyl, 4,4'-biscyanato-diphenyl; dialkylamino phenyl cyanates such as 4-dimethylamino-phenyl cyanate and 4-dimethylamino-3-methyl phenyl cyanates; acylamino phenyl cyanates such as 4-acetylamino phenyl cyanate; nitrophenyl cyanates such as 4-nitro-, 3-nitro-, 4-nitro-3-methyl- and 3-nitro-6-methyl-phenyl cyanate; halophenyl cyanates such as 2-chloro-, 3-chloro-, 4-chloro-, 4-fluoro-, 4-iodo, 2,4-dichloro-, 2,6-dichloro-, 3-bromo-, 2-chloro-6-methyl-, 5-chloro-2-methyl-, 6 - chloro - 2 methyl-, 4-chloro-2- methyl-, 4-bromo-2-methyl-, 4-fluoro-2-methyl-, 3-chloro-2-methyl, 4-chloro-3-methyl-, and 6-chloro-3-methylphenyl cyanate; cyanatophenyl carboxylic acid esters and amides, such as 2-cyanato benzoic acid phenyl ester, 2-cyanato benzoic acid-2-chloro phenyl ester, 2-cyanato benzoic acid-2,4 or 2,6-dichloro phenyl ester, 2-cyanato benzoic acid naphthyl-(2)-ester, 5-chloro-2-cyanatobenzoic acid-2,6-dichlorophenyl ester, 3-methyl-2-cyanatobenzoic acid phenyl ester, 4-methyl-2-cyanatobenzoic acid phenyl cyanate; cyanatophenyl carboxylic acid esters and naphthyl-(2)-ester, 3-nitro-2-cyanatobenzoic acid aryl esters, 5-tert.-butyl-2-cyanatobenzoic acid aryl esters, 3-methoxy-2-cyanatobenzoic acid aryl esters, 4-cyanatobenzene dicarboxylic acid-(1,3)-diphenyl ester, 2,5-dicyanato-1,4-benzene dicarboxylic acid aryl esters, 5,5'-methylene-2,2'-dicyanato disalicylic acid diphenyl ester, 5,6,-7,8-tetrahydro-2-cyanato-naphthalene carboxylic acid-(3)-aryl esters, 1-cyanato-naphthoic acid-(2)-aryl esters, 2-cyanato-naphthoic acid-(1)-aryl esters, 2-cyanato-naphthoic acid-(3)-aryl esters, 2-cyanatobenzoic acid methyl ester, 2-cyanato benzoic acid ethyl ester, 2-cyanato-benzoic acid-i-butyl ester, 2-cyanato-benzoic acid amyl ester, 3-methyl-2-cyanato-benzoic acid methyl ester, 4-methyl-2-cyanato-benzoic acid amyl ester, 3-methoxy-2-cyanato-benzoic acid propyl ester, 4-cyanato-benzene dicarboxylic acid-(1,3)-dimethyl ester, 2-cyanato-benzoic acid morpholide and -diethylamide; cyanato-phenyl sulphonic acid, esters and amides such as 4-cyanato-benzene sulphonic acid; alkoxy or alkyl mercapto phenyl cyanates such as 2-methoxy, 2-methoxy-4-chloro, 3-methoxy, 4-isopropoxy phenyl cyanate, 4-methyl mercapto phenyl cyanate, 4-dodecyl mercapto phenyl cyanate, 2,4-bis-methyl-mercapto-3-methyl phenyl cyanate; phenoxy phenyl cyanates such as 4-cyanatodiphenyl ether; acyloxy phenyl cyanates such as 3-acetoxyphenylcyanate; acyl phenyl cyanates such as 2- or 4-acetyl phenyl cyanate; cyanatophenyl cyanates such as 2,3-dicyano-1,4-dicyanato-benzene; α- and β-naphthyl cyanate, anthraquinyl cyanates such as 1,4- or 1,5-dicyanato-anthraquinone; quinoline cyanates such as 5-cyanato-quinoline; cyanato-carbazoles such as 2-cyanato-carbazole; 1,3- or 1,4-phenylene dicyanate, 3,5-dicyanato-toluene, 1,5-naphthylene dicyanate, 1,3,5-tricyanatobenzene, 4,4'-bis-cyanato diphenyl dimethyl methane, 4,4'-bis-cyanato diphenyl cyclohexane-1,1; 2,2'-bis-cyanato dinaphthyl, 4-methylmercapto phenyl cyanate, 3-N,N-dimethyl carbamyl phenyl cyanate, 4-cyanato benzaldehyde and the cyanic acid esters of for example the following alcohols: β-bromo- or iodo-ethanol, β,β-dichlorethanol, β,β,β-trichlorethanol, β,β,β-trifluorethanol, β,β,β-tribromoethanol, β,β,β-triiodoethanol, β,β-dichloro-β-fluorethanol and $$H(CF_2-CF_2)_5-CH_2OH$$

The hydrogen thiocyanate can be used as such, but it is preferably liberated just before or in the course of the reaction by acids (such as $H_2SO_4$ or HCl) or acid salts (such as $KHSO_4$) from its salts such as NaSCN, KSCN, or $(NH_4)SCN$. Examples of solvents are organic solvents such as alcohols, ketones, ethers, nitriles, esters, amides aromatic and aliphatic and optionally nitrated or halogenated hydrocarbons, or water. Examples to be mentioned here are methanol, ethanol, acetone, diethylether, acetonitrile, ethylacetate, dimethyl formamide, benzene, petroleum ether, nitrobenzene, nitromethane, chloroform, carbon tetrachloride and chlorobenzene.

The components for carrying out the process can be combined in any desired sequence, advantageously in one of the said diluents. Generally, the reactants comprising the cyanate groups and hydrogen thiocyanate are used in the molar ratio of 1:2. An excess of hydrogen thiocyanate has no disturbing effect. The products of the process usually precipitate and are isolated, optionally after concentration of the solvent, by filtering with suction. Salt which may possibly also precipitate and which originates from the liberation of the hydrogen thiocyanate from its salts (e.g. $K_2SO_4$), is removed by washing.

The new 2,4-dimercapto-6-aroxy (or alkoxy) 1,3,5-triazines can be used for destroying weeds in cereal cultures. When applying for instance 2 kg./1 ha. (=10,000 qm.) of 2,4-dimercapto-6-phenoxy-1,3,5-triazole as a 0.1 to 0.5% aqueous solution *Sinapis arvensis* is completely destroyed (post emergence test). Furthermore, the same compound is effective in destroying fungi as *Pricularia orize* in rice cultures. When applying 2,4-dimercapto-6-phenoxy-1,3,5-triazole in a concentration of 500 p.p.m. as an aqueous solution an evident decrease of the attack of *Pricularia orize* can be observed.

Also the other compounds described in the specification can be used for the same purposes.

Example 1

To an aqueous solution of 15.2 g. (0.2 mol) of $NH_4SCN$, which is covered with a layer of 100 ml. of ether, there are slowly added, at $-50°$ C. and while stirring and cooling, first of all 17.8 g. of 55% $H_2SO_4$ and then 11.9 g. (0.2 mol) of phenyl cyanate. 22 g. (92.5% of the theoretical) of the crude substance

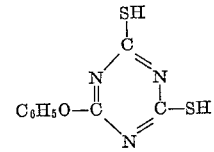

are precipiated and are isolated by filtering with suction: M.P.: after recrystallisation from alcohol: 248° C. (with decomposition).

Analysis.—$C_9H_7N_3OS_2$ (molecular weight 237). Calculated: C, 45.6%; H, 2.95%; N, 17.7%; O, 6.75%; S, 27.0%; mol. wt., 237. Found: C, 45.84%; H, 3.17; N, 14.47%; O, 7.31%; S, 27.05; mol. wt. 238, 237. SH groups, titration.—Calculated: 278%. Found: 28.2%.

Example 2

In a manner similar to Example 1, from 15.3 g. of $NH_4SCN$, 14.7 g. of 2,4-dimethyl phenyl cyanate and 14 ml. of 50% of $H_2SO_4$, there are obtained at $-10°$ to $+10°$ C., 22.8 g. (86% of the theoretical) of the crude substance of the formula

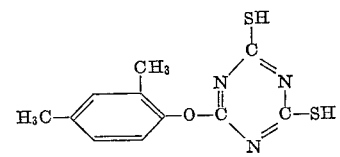

of M.P.: 225° C. (with decomposition).

Analysis.—$C_{11}H_{11}N_3O_1S_2$ (molecular weight 265). Calculated: C, 49.8%; H, 4.15%; N, 15.8%; O, 6.03%; S, 24.2%; mol. wt. 265. Found: C, 49.77%; H, 4.35%; N, 15.83%; O, 6.29%; S, 24.35%; mol. wt. 262, 266. 2,4-dimercapto-6-(tert.-butylphenoxy)-1,3,5-triazine is obtained in analogous manner when using 4-tert.-butyl phenyl cyanate.

Example 3

9.8 g. (0.1 mol) of KSCN are dissolved in 10 ml. of water, covered with a layer of 50 ml. of ether and cooled. At $-5°$ to 0° C., a solution of 13.7 g. (0.1 mol) of $KHSO_4$ in 40 ml. of water is added and thereafter 7.65 g. (0.05 mol) of 3-chlorophenyl cyanate are introduced dropwise. Crystallisation occurs immediately. After suction filtering, washing and drying, there are obtained 12.6 g. (92.5% of the theoretical) of crude substance of the formula

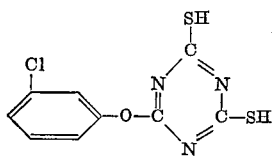

M.P.: >300° C.

*Analysis.*—C₉H₆ClN₃OS₂ (molecular weight 271.5). Calculated: C, 39.8%; H, 2.1%; Cl, 13.1%; N, 15.5%; O, 5.9%; S, 23.6%; mol. wt., 271.5. Found: C, 39.47%; H, 2.41%; Cl, 12.6%; N, 15.7%; O, 6.3%; S, 24.3%; mol. wt. 265, 269.

In similar manner, when using 2-chlorophenyl cyanate, 2,4-dimercapto-6-(2'-chlorophenoxy)-1,3,5-triazine is obtained; when using 4-chlorophenyl cyanate, 2,4-dimercapto - 6 - (4'-chlorophenoxy)-1,3,5-triazine is obtained; with 2,4-dichlorophenyl cyanate, 2,4-dimercapto-6-(2',4'-dichlorophenoxy)-1,3,5-triazine is obtained; with 2,6-dichlorophenyl cyanate, 2,4-dimercapto-6-(2',6'-dichlorophenoxy)-1,3,5-triazine is obtained; with 4-bromophenyl cyanate, 2,4 - dimercapto-6-(4'-bromophenoxy)-1,3,5-triazine is obtained; with 3-fluoromethyl phenyl cyanate, 2, 4 - dimercapto-6-(3-trifluomethyl phenoxy)-1,3,5-triazine is obtained; with 2-chloro-4-cyanophenyl cyanate, 2,4-dimercapto - 6 - (2' - chloro - 4 - cyanophenoxy) - 1,3,5-triazine is obtained; with 2-chloro-6-methyl phenyl cyanate, 2,4-dimercapto-6-(2'-chloro-6'-methyl phenoxy)-1,3, 5-triazine is obtained.

Example 4

7.7 g. (0.1 mol) of NH₄SCN, dissolved in 10 ml. of water, are covered with a layer of 50 ml. of ether. Now 7.65 g. (0.05 mol) of 3-chlorophenyl cyanate are first of all added dropwise, followed by 7 ml. of 50% H₂SO₄. There are obtained 12.5 g. of the same product as in Example 3 after the same type of working up; (identical infra-red spectra).

Example 5

5 g. (0.066 mol) of NH₄SCN are dissolved in 5 ml. of water, covered with a layer of 50 ml. of ether and then 4.2 ml. of H₂SO₄ (50%) are added at 0° C. A solution of 6.3 g. (0.03 mol) of 4-methacroylamino phenyl cyanate in 15 ml. of acetone is then added. Crystallisation occurs at once. After stirring for another 30 minutes, the substance is filtered with suction, washed and dried. Crude yield: 8.3 g. (86.5% of the theoretical) of the compound of the formula

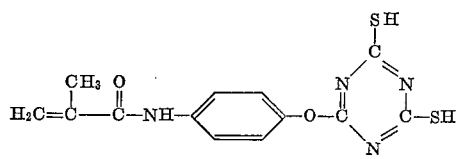

After taking up in nomal NaOH, reprecipitating with HCl and extracting by boiling with alcohol, the melting point is 316° C. (with decomposition).

*Analysis.*—C₁₃H₁₂N₄O₂S₂ (molecular weight 320). Calculated: C, 48.8%; H, 3.7%; N, 17.5% O, 10.0%; S, 20.0%. Found: C, 49.27%; H, 3.97%; N, 17.26%; O, 10.43%; S, 19.55%.

Example 6

In a manner similar to Example 1, and from 9.7 g. (0.1 mol) of KSCN, 8.7 g. (0.05 mol) of β,β,β-trichloroethyl cyanate and 7 ml. of 50% H₂SO₄, there are obtained 13.7 g. (93.5% of the theoretical) of the crude compound of the formula

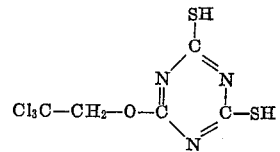

of M.P. 200° C.

*Analysis.*—C₅H₄Cl₃N₃OS₂ (molecular weight 292.5). Calculated: C, 20.6%; H, 1.37%; N, 14.35%; O, 5.47%; S, 21.9%. Found: C, 21.25%; H, 1.69%; N, 14.84%; O, 6.03%; S, 21.4%.

In similar manner, when using β,β,β-tribromo-ethyl cyanate, 2,4-dimercapto-6-(β,β,β-tribromo-ethoxy)-1,3,5-triazine is obtained; with β,β,β-trifluoroethyl cyanate 2,4-dimercapto-6-(β,β,β-trifluoroethoxy)-1,3,5-triazine is obtained; with β,β-dichloroethyl cyanate 2,4-dimercapto-6-(β,β-dichloroethoxy)-1,3,5-triazine is obtained; with β,β-dichloro-β-fluorethyl cyanate 2,4 - dimercapto-6-β,β-dichloro-β-fluorethoxy-1,3,5-triazine is obtained; and with the decafluorine compound.

the ether of 2,4-dimercapto-1,3,5-triazine is obtained, with the H(CF₂—CF₂)₅—CH₂—O— radical in the 6-position.

Example 7

An aqueous solution of 7.65 g. (0.1 mol) of ammonium thiocyanate is covered with a layer of 50 ml. of di-n-propyl-ether. 7 ml. (0.05 mol) of 50% aqueous sulphuric acid and thereafter 8.85 g. (0.05 mol) of 2-cyanatobenzoic acid methyl ester are then added at −5° C. The product of the formula

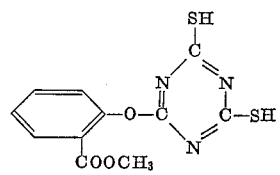

precipitates, is suction filtered, washed and dried. 2 mols of the product crystallise with 1 mol. of water. Yield: 13.2 g. (87% of the theoretical); M.P., 212° C. (with decomposition).

*Analysis.*—C₁₁H₉N₃O₃S₂.1/2H₂O=C₁₁H₁₀N₃O₅S₂ (molecular weight 304). Calculated: C, 43.4%; H, 3.39%; N, 13.8%; O, 18.4%. Found: C, 43.18%; H, 3.34%; N, 13.79%; O, 18.65%.

Example 8

If an aqueous solution of 7.7 g. (0.1 mol) of ammonium thiocyanate is covered with 50 ml. of benzene and if then, at 5 to 10° C., first of all 7 ml. (0.05 mol) of 50% aqueous sulphuric acid are added, followed by 7.65 g. (0.05 mol) of 3-chlorophenyl cyanate, there are obtained 13.0 g. (95% of the theoretical) of the same products as in Example 3 (identical infra-red spectra).

Example 9

In a similar manner to Example 8, 11.0 g. (81% of the theoretical) of the same product as in Example 3 (identical infra-red spectra) are obtained from 9.8 g. (0.1 mol) of potassium thiocyanate, 7 ml. of 50% aqueous sulphuric acid and 7.65 g. (0.05 mol) of 3-chlorophenyl cyanate in a mixture of 50 ml. of water and 50 ml. of acetone.

Example 10

An aqueous solution of 9.8 g. (0.1 mol) of potassium thiocyanate is covered with ether and 7 ml. (0.05 mol) of 50% aqueous sulphuric acid are added. 8.05 g. (0.05 mol) of 4-acetyl phenyl cyanate are then added in portions. The product of formula

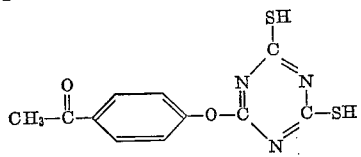

precipitates and is isolated by filtering with suction. Yield: 13.0 g. (93% of the theoretical).

The substance is crystallised with 1 mol of alcohol from alcohol. M.P.: 207 to 208° C. (with decomposition).

*Analysis.*—$C_{11}H_9N_3O_2S_2 \cdot C_2H_5OH = C_{13}H_{15}N_3O_3S_2$ (molecular weight 325). Calculated: C, 48.0%; H, 4.62%; N, 12.9%; O, 14.8%; S, 19.1%. Found: C, 48.16%; H, 4.98%; N, 12.95%; O, 14.67%; S, 19.55%.

Example 11

In a similar manner to Example 10, and from 4.3 g. (0.025 mol) of α-naphthyl cyanate and 4.85 g. (0.05 mol) of potassium thiocyanate, there are obtained 7.0 g. (97% of the theoretical) of the compound of the formula

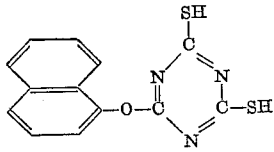

On recrystallisation from dioxane, 2 mols of substance crystallise with 1 mol of solvent. M.P.: 252° C. (with decomposition).

*Analysis.*—

$$C_{13}H_9N_3OS_2 \cdot 1/2C_4H_8O_2 = C_{15}H_{13}N_3O_2S_2$$

(molecular weight 331). Calculated: C, 54.35%; H, 3.93%; N, 12.7%; O, 9.7%; S, 19.3%. Found: C, 54.25%; H, 4.02%; N, 12.55%; O, 10.40%; S, 18.90%.

Example 12

In a similar manner to Example 10, from potassium thiocyanate, 50% aqueous sulphuric acid and 4-nitrophenyl cyanate in ether/water/acetone, there is obtained the compound of formula

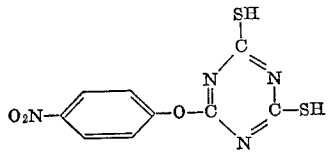

which crystallises from dioxane with 1 mol of solvent. M.P.: 194°C. (with decomposition)

*Analysis.*—$C_9H_6N_4O_3S_2 \cdot C_4H_8O_2 = C_{13}H_{14}N_4O_5S_2$ (molecular weight 370). Calculated: C, 42.20%; H, 3.78%; N, 15.15%; O, 21.6%. Found: C, 42.24%; H, 3.83%; N, 15.18%; O, 21.9%.

Example 13

In a similar manner to Example 7, and from 7.6 g. (0.1 mol) of ammonium thiocyanate and 4 g. (0.025 mol) of 1,4-dicyanatobenzene, there are obtained 7.1 g. (72% of the theoretical) of the compound of formula

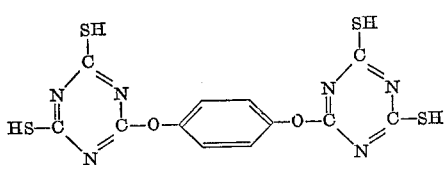

of M.P.: 256°C. (with decomposition).

*Analysis.*—$C_{12}H_8N_6O_2S_4$ (molecular weight 396). Calculated: C, 36.40%; H, 2.02%; N, 21.20%. Found: C, 36.57%; H, 2.56%; N, 20.58%.

Example 14

A solution of 14.7 g. (0.1 mol) of 2,4-dimethyl phenyl cyanate phenyl cyanate in 40 ml. of ether is introduced dropwise into a freshly prepared dried solution of ~12 g. (~0.2 mol) of thiocyanic acid in anhydrous ether. 18.6 g. (70% of the theoretical) of the same product as in Example 2 precipitate (identical infra-red spectra).

What we claim is:

1. A compound of the formula

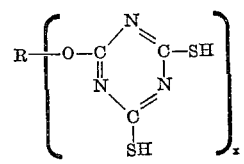

wherein R is a member selected from the group consisting of
   (A) haloalkyl, the alkyl moiety thereof having 1–20 carbon atoms;
   (B) an aromatic radical having up to 20 carbon atoms in the ring system; and
   (C) an aromatic radical having up to 10 carbon atoms in the ring system connected to a heterocyclic ring selected from the group consisting of quinoline, isoquinoline, carbazole, diphenyloxide, xanthene, indole, acridine, indazole, benztriazole, benzimidazole, phenazine, quinoxaline, benzoxazole, phenoxazine, benzthiazole, thionaphthene or thioxanthene; and $x$ is an integer of 1–3.

2. A compound of claim 1 wherein the (B) aromatic radical is a phenyl, naphthyl, diphenyl, diphenyl-oxide, diphenyl methane, diphenyl propane, diphenyl sulphide, diphenyl sulphone, dinaphthyl, anthracenyl or phenanthrenyl.

3. The compound of claim 1 wherein the aromatic and heterocyclic radicals contain as substituents a member selected from the group consisting of an alkyl of 1–20 carbon atoms; phenyl; halophenyl; nitrophenyl; alkoxyphenyl having 1–10 carbon atoms in the alkoxy moiety; alkylmercaptophenyl having 1–10 carbon atoms in the alkyl moiety; acylphenyl having as acyl an aliphatoyl moiety of 1–4 carbon atoms; naphthyl; halonaphthyl; nitronaphthyl; alkoxynaphthyl having 1–10 carbon atoms in the alkoxy moiety; alkyl mercaptonaphthyl having 1–10 carbon atoms in the naphthyl moiety; acyl naphthyl having as acyl an aliphatoyl moiety of 1–4 carbon atoms; monoalkylamino and dialkylamino, the alkyl moiety thereof having 1–18 carbon atoms; acylamino having as acyl an aliphatoyl moiety of 1–18 carbon atoms; acylamino having as acyl a benzoyl moiety; nitro; halo; alkoxy; phenoxy; naphthoxy; acyloxy having as acyl an aliphatoyl moiety of 1–10 carbon atoms; acyloxy having as acyl a benzoyl moiety; carbonyl; alkyl carboxylate having an alkyl group of 1–18 carbon atoms; phenyl carboxylate; naphthyl carboxylate; carboxylic monoalkylamide and carboxylic dialkyl amide having alkyl moieties of 1–18 carbon atoms; carboxylic dialkylamide wherein the two alkyl groups of the amide are combined to form a 6-membered ring; carboxylic monoaryl amide; carboxylic diaryl amide; aliphatic sulfonic acid ester of 1–10 carbon atoms; phenyl sulphonic acid ester; sulphonic acid monoalkyl amide and sulphonic acid dialkylamide, the alkyl groups thereof containing 1–18 carbon atoms; dialkyl amide in which the two alkyl groups of the amide are combined to form a 6-membered ring; sulphonic monoaryl amide and sulphonic diarylamide; acyl having an alkyl moiety of 1–18 carbon atoms; acyl having a benzoyl moiety; cyano; thiocyano; alkyl-mercapto having a alkyl moiety of 1–18 carbon atoms; aryl-mercapto; acylmercapto having as acyl moiety an alkoyl of 1–18 carbon atoms, and acylmercapto having as acyl moiety a benzoyl radical.

References Cited

UNITED STATES PATENTS

| | | | |
|---|---|---|---|
| 2,525,714 | 10/1950 | Norton | 260—248 |
| 2,598,811 | 6/1952 | Mahan et al. | 260—248 |
| 2,762,797 | 9/1956 | Hechenbleikner | 260—248 |
| 2,805,222 | 9/1957 | Grundmann et al. | 260—248 |
| 2,858,310 | 10/1958 | Grundmann et al. | 260—248 XR |
| 3,056,751 | 10/1962 | Fierce et al. | 260—248 XR |
| 3,060,179 | 10/1962 | Toland | 260—248 |

OTHER REFERENCES

Klason, Journal fur Praktiscke Chemie, vol. 141, N.F., 33, pp. 121–3 (1886).

HENRY R. JILES, *Primary Examiner.*

J. M. FORD, *Assistant Examiner.*

U.S. Cl. X.R.

71—93; 260—999